United States Patent
Lakshman et al.

(10) Patent No.: US 6,269,078 B1
(45) Date of Patent: *Jul. 31, 2001

(54) METHOD AND APPARATUS FOR SUPPORTING COMPRESSED VIDEO WITH EXPLICIT RATE CONGESTION CONTROL

(76) Inventors: T. V. Lakshman, 118 Victoria Dr., Eatontown, NJ (US) 07724; Partho Pratim Mishra, 180 Summit Ave, H4 Summit, NJ (US) 07901; Kadangode K. Ramakrishnan, 9 Highland Cir., Berkeley Heights, NJ (US) 07922

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/825,988
(22) Filed: Apr. 4, 1997
(51) Int. Cl.[7] ............................. H04L 12/26; H04L 12/56
(52) U.S. Cl. ...................... 370/230; 370/235; 370/395; 370/468
(58) Field of Search ................................. 370/229, 230, 370/231, 232, 233, 234, 235, 236, 395, 468

(56) References Cited

U.S. PATENT DOCUMENTS

| | | | |
|---|---|---|---|
| 5,537,446 | * 7/1996 | Lakshman et al. | 375/371 |
| 5,636,212 | * 6/1997 | Ikeda | 370/223 |
| 5,812,526 | * 9/1998 | Chang et al. | 370/230 |
| 5,884,037 | * 3/1999 | Aras et al. | 395/200.3 |

* cited by examiner

*Primary Examiner*—Chau Nguyen
*Assistant Examiner*—Soon-Dong Hyun

(57) ABSTRACT

A method and system provide for adaptive coding for transporting of compressed video data. The method and system include techniques for predicting the rate which an encoder needs to be able to supply video to a network. The method and system also include the network receiving the demand rate and calculating an allocation rate which is ultimately fed back to the video source setting an explicit rate for the transporting of compressed video. Furthermore, it includes the adaptation of the encoding rate at the video source in accordance with the explicit rate allocated by the network in response to the demand.

18 Claims, 6 Drawing Sheets

METHOD AND APPARATUS FOR SUPPORTING COMPRESSED VIDEO WITH EXPLICIT RATE CONGESTION CONTROL

BACKGROUND OF THE INVENTION

The present invention relates to a method and apparatus for transmitting video data while controlling congestion through a network in which the video is transmitted. More particularly, the present invention relates to support for compressed video providing explicit rate congestion control including adapting the rate of encoding the video.

More and more frequently, video information is the subject of data transfers through existing networks. Examples of such a video traffic include video data associated with a real-time communication such as a video teleconference and pre-stored video entertainment information. It is well known to provide mechanisms for compressing the video data to facilitate the transfer of video over existing networks. Compressed video traffic is likely to form a significant component of the workload of future networks.

FIG. 1 illustrates, in schematic form, an example of a known video transmission system. A video encoder/transmitter 10 receives video signals at its input 11 and produces compressed video data at its output 12. The compressed video information is sent into the network 20 where it traverses a number of switches, for example 21, 22 and 23 as it is routed to its intended destination, here shown as receiver/decoder 30. The receiver then takes the encoded information, decodes it and outputs the video signal.

It is also known that the video encoder can provide some adaptive control so as to govern the rate at which the compressed video, which is known to be inherently bursty is provided to the network. An example of a known adaptive encoder is illustrated in FIG. 1A. In this known encoder the video received at input 11 is provided to the transform device 13. The transform device creates the encoded data and transfers that encoded data to internal buffer 14. The internal buffer then outputs encoded data to the network through the output 12. If the transform device 13 is encoding data faster than the buffer is outputting data then the buffer 14 begins to fill. A feedback mechanism as indicated by line 15 permits the buffer to notify the transformer of the status of the buffer so as to allow the transformer 13 to adapt its encoding rate to avoid overfill of the buffer. If the transformer is encoding video at a rate slower than the buffer is outputting data then the buffer could run dry if the feedback mechanism was not in place to advise the transformer 13 to increase its rate of encoding.

Work has already been done in examining how to transmit compressed video over Asynchronous Transfer M (ATM) networks. In fact, a number of different methods have been proposed. These methods attempt to exploit different service classes that the underlying ATM network is capable of transporting. The classes of services offered by ATM networks include: Constant Bit Rate (CBR), Variable Bit Rate (VBR), the best-effort classes of service, Available Bit Rate (ABR), and Unspecified Bit Rate (UBR).

In a proposal to transmit compressed video using the CBR service, the inherently variable bit rate output of a video encoder is locally buffered in the encoder to convert it into a CBR stream. Thus, in the example shown in FIG. 1A, the buffer 14 operates to produce a constant bit rate output at 12 while providing feedback to the transformer 13 to adjust the encoding rate of the transformer so that data is not lost by overfilling and also that the buffer does not run dry. However, this can result in a variable quality constant bit rate stream. That is, with CBR there is no correlation between the transformer encoding rate and the type of video that is being received by the transformer. Thus, it is possible that as the buffer signals back to the transformer that it needs to adjust the encoding rate, it will do so at a time that the video signal will be ill-served by the requested adjustment so as to degrade the quality of the signal represented by the constant bit rate stream. Thus, employing this transport scheme is costly in terms of variable quality. Furthermore, there is a penalty in that there is no attempt to exploit any multiplexing gains that are possible in the original variable bit rate traffic. However, the advantage to this scheme is that the constant bit rate nature of this stream makes admission control to the network trivial.

An unrestricted (or open-loop) VBR provides that the inherently bursty video traffic from the encoder is transported over the real-time VBR service class. Since peak-to-mean ratios of the traffic can be high, there is a potential for multiplexing gain and the "effective" bandwidth needed may be less than that for CBR of the same quality. In this configuration the source rate itself does not adapt to the network's state. An example of an encoder in such a service could be obtained by modifying the encoder of FIG. 1A to delete the feedback provided by line 15. For admission control of such sources it is necessary to provide an accurate source model and it is also necessary to police the sources to insure that they conform to the model. Due to this latter requirement, source models in practice are restricted to simple models such as the specification of peak rate, average rate and a maximum burst size (which can be policed using leaky buckets). Such a simple source model forces admission control to be conservative since the lack of statistics regarding source behavior, necessitates conservative assumptions, to overcome errors in estimation/prediction.

The use of the best-effort service for transport of compressed video requires unrestricted source adaptation as in the Internet Video Tools (such as VIC, NV) where the sources adapt to the rate offered by the network. This can be viewed as an extreme of a rate adaptive source in contrast to the opposite end of the spectrum, the unrestricted VBR service, where sources do not adapt to network conditions at all. Using a best-effort service, the quality can get unacceptably poor since there is no minimum rate guaranteed.

A hybrid approach has also been considered. This hybrid can be referred to as renegotiated CBR (RCBR) which is a hybrid of the CBR and VBR approaches. The renegotiated CBR attempts to combine the simplicity of admission control for CBR with the advantages of VBR. This is based on the observation that video traffic has fluctuations happening over both short time scales (less than typical buffer drain times) and long time scales. A component of multiplexing gain in unrestricted CBR is the buffer-less multiplexing gain (from the multiplexing gain across sources). RCBR simplifies network support for VBR video by accounting only for this gain, that is, it does not attempt to extract the gains from shared buffering in the network. An effective bandwidth also referred to as an effective bit rate is requested such that the source buffer can absorb short-term fluctuations without exceeding specified loss rates. The requested rate is then renegotiated when a change in the slow (long) time scale is detected. The network therefore sees sources with piece wise linear rates that can be transported as CBR streams. The scheme depends on distinguishing short-term fluctuations from long-term trend changes and the rate renegotiation involves signaling. Unfortunately, on present day systems this can reasonably be done only in intervals of at least a few tens, if not hundreds, of frames. Furthermore, it is not only required that a trend change be detected, but also that at the beginning of such a change period an effective bandwidth valid over the slow time scale (on the order of seconds) be forecast. An algorithm for computing optimal rate requests for stored video is described in a paper entitled "RCBR: A Simple and Efficient Service for Multiple Time Scale Traffic" by Grossglauser et al., proceedings of the ACM SIGCOMM 1995 Conference, September 1995. However, a method to compute rate requests for real-time video is not given. A source initiated renegotiation necessarily implies that there is no mechanism for the network to inform sources of congestion abatement and newly available bandwidth. Hence, a source which adapts downward cannot use newly available bandwidth until the next renegotiation instant. Achieving low renegotiation blocking with RCBR (needed to control loss and frequent downward adaptations) requires careful engineering of the network and a good model for the distribution of source rates over the slow time scale.

Having reviewed the features to these ATM service classes it is appropriate to consider how the needs of video transmission mesh with these services. Maintaining low overall delay is critical especially for interactive video. An explicit rate scheme, with appropriate switch rate allocation mechanisms, ensures that the aggregate rate of all of the sources sharing the resource remains below the resource capacity.

Unlike data, transmitting entertainment quality video or video from teleconferencing applications requires a minimum bandwidth from the network to insure acceptable quality even in periods of congestion. Traditional best-effort services in data networks such as the current TCP/IP Internet have not provided such a minimum bandwidth while some of the service classes in ATM are designed to support such a minimum.

It would be advantageous if there existed a scheme for the transmission of compressed video data that took advantage of a number of the more desirably features of the above known transport mechanisms. For instance, it would beneficial to provide a mechanism that preserves the simple call admission control feature of CBR while exploiting the inherent negotiation available in explicit rate schemes.

SUMMARY OF THE INVENTION

The present invention provides such an advantageous scheme for the transport of compressed video data. In accordance with the present invention a source adaptive rate encoder determines a desired rate and requests that the network provide or allocate such a rate to the source. The network then analyzes the request and reports back an allocated rate which is dependent upon the demand rate of the source, the demand rate of other sources and the overall bandwidth or channel capacity available at that time. Upon receiving notice of the allocated rate, the adaptive rate encoder then adjusts its encoding rate to match the allocated rate.

The present invention takes advantage of a service referred to as Available Bit Rate (ABR) in ATM networks. In an embodiment of the present invention the encoder predicts needed rates over very short intervals and requests a rate of the network using a resource management cell provided in the ABR service scheme. The rate typically relates to the number of cells of bits which can be transmitted per unit of time. The network processes the request, allocating bandwidth among video sources in accordance with their demands and the bandwidth availability at each of the switches. The requesting video source is then advised of the explicit rate permitted and the encoder then adjusts the encoding rate accordingly.

The resource management cell in the ABR scheme allows for frequent renegotiation of the rate between the source and the network. In addition, ABR provides for allocating a minimum cell rate by allowing the source to request a minimum acceptable rate from the network. Since the admission control for ABR is simple, based on a minimum rate, the same simplicity as CBR for admission control is available. By setting this rate equal to an effective bandwidth of the source, computed for a single source and using only a source buffer in the calculations, it is possible to operate in a VBR-like mode with few rate adaptations. However, there is room for more aggressive admission of additional streams, when rate adaptation takes care of the occasional situation when multiple streams simultaneously desire a high bandwidth.

The present invention also provides for predicting the rate that the video source will need and hence should demand depending on the types of video, such as video teleconferences, or entertainment quality videos such as MPEG video. In a further improvement the present invention smooths out the predicted rate by averaging the predicted rate over a predetermined number of frames and then bases the demand to the network on this smoothed predicted need.

DETAILED DESCRIPTION

The present invention provides a new method and system for transporting compressed video that provides feedback control of the encoding rate. The present invention takes advantage of one of the classes of service offered by ATM networks, the Adjustable-Bit Rate (ABR) scheme. In accordance with this explicit rate mechanism, a video source supplies a Demand, a desirable cell rate, to the network. The network, in the form of the switches and links which transport the video data, allocates bandwidth (cell rate) to the video sources connected to the network in accordance with one of a selected number of different methods which are referred to below. Once the network has allocated bandwidth, a notice is provided back to the video source as to the explicit rate at which it is permitted to operate. Then, an adaptable rate video encoder receives the explicit rate information and adapts the video rate to conform to the explicit rate defined by the network.

To enhance the overall quality of the video bit stream, allowing a more perfect match of encoding rates to the video information from the source, the present invention also provides a mechanism for predicting demands to be made of the network based on the character of the video information which is to be encoded in the future. The demand operation can be enhanced by averaging the demands from the source over a given time period so as to smooth out the demands presented to the network whereby reducing some of the problems which could arise from the bursty nature of the video data.

Figure 5:
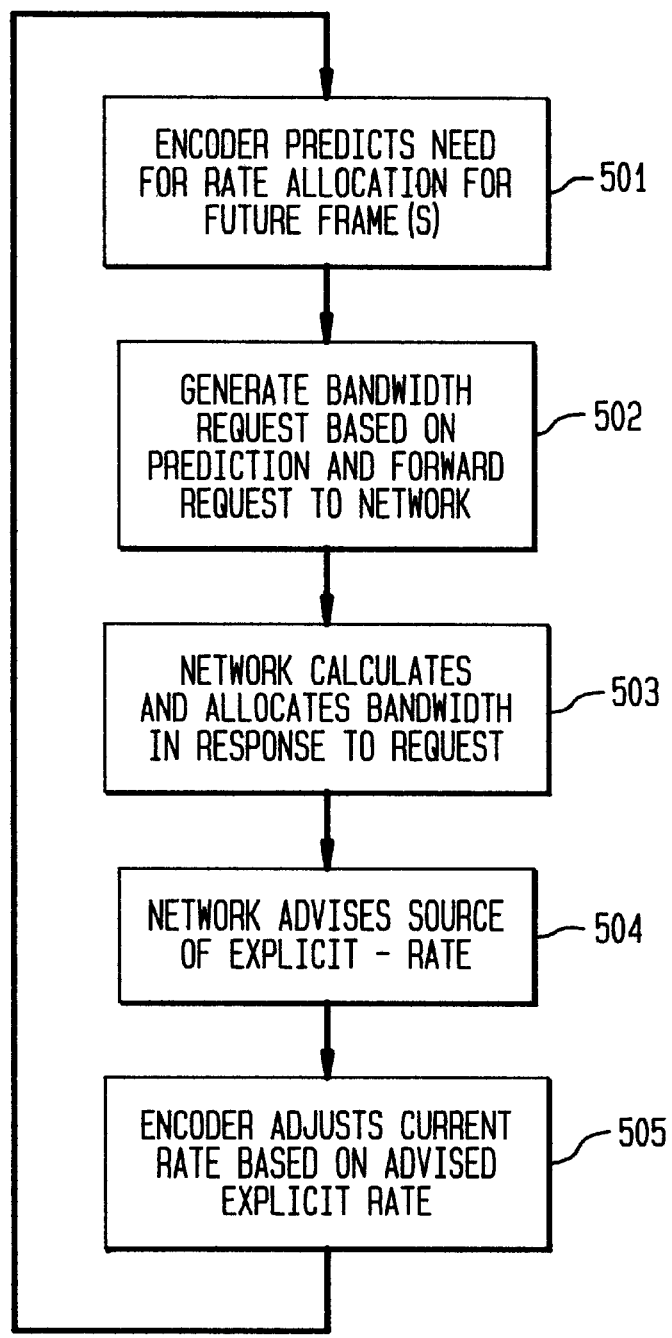
FIG. 5 provides a flow chart describing operation of an embodiment of the present invention.

FIG. 5 is a simple flow chart indicating the series of processes which would be undertaken in connection with controlling the rate of encoding at the video source. In step 501 the video source predicts the bandwidth or encoding rate which will be necessary for a near future collection of video data. Having generated such a prediction, the source generates a bandwidth request and transmits it to the network in step 502. The network then processes this request to determine an explicit rate at which the video source should transmit in step 503 and sends that explicit rate back to the video source in step 504. The encoder at the video source is then adjusted to reflect the rate allocated to the video source by the network in step 505. The process is then repeated.

Figure 1:
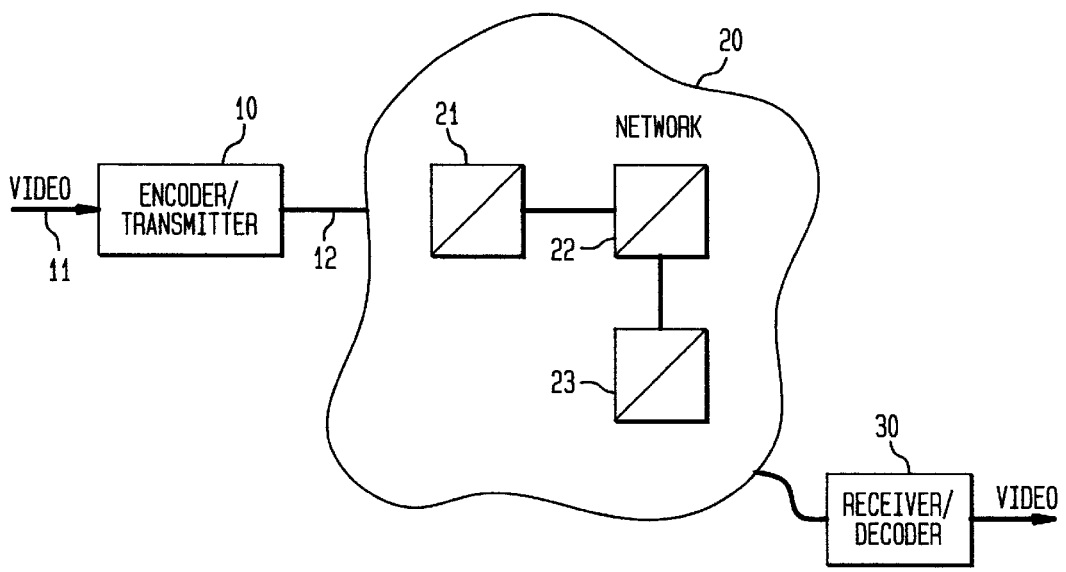
FIG. 1 illustrates a known configuration for transmitting compressed video information.
Figure 1A:
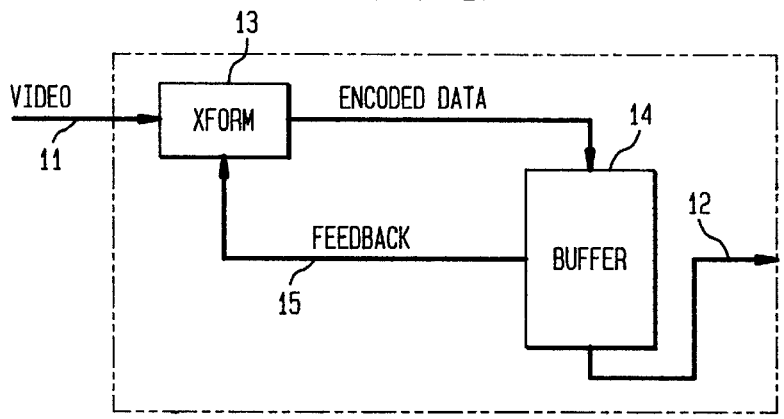
FIG. 1A illustrates a known adaptable video encoder.
Figure 2:
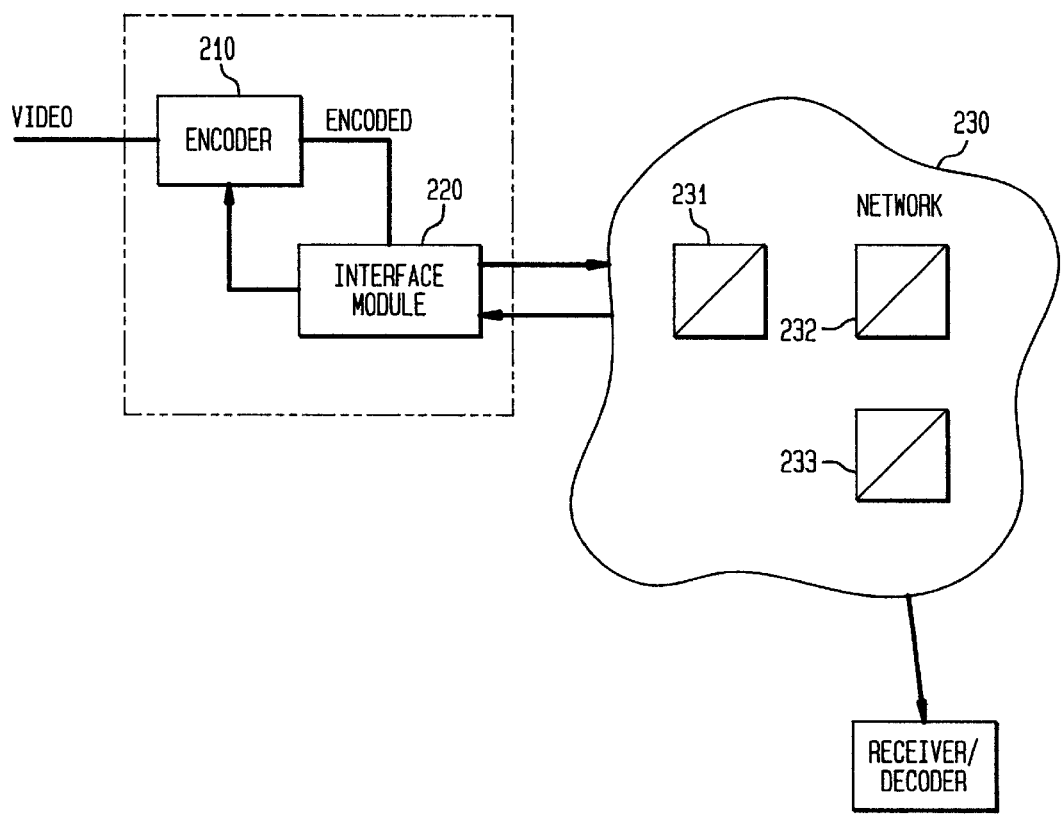
FIG. 2 illustrates an embodiment of the present invention.

FIG. 2 illustrates one embodiment for implementing the present invention. An encoder 210 receives video information and produces encoded video. A network interface module 220 is connected between the encoder 210 and the network 230. As in FIG. 1 the network can comprise a number of switches, for example 231, 232, and 233, etc. The interface module has a two-way connection with the network in that it sends information out into the network (as represented by line 221) and receives information back from the network (as represented by line 222). This is particularly critical to the notion of receiving from the network a designation of the explicit rate which the network will permit the video source (as represented by the encoder and interface module) to provide video data to the network. The interface module 220 generates and transmits the request (Demand) to the network based on the prediction made as to the rate needed for future video information. The interface module then receives the feedback information from the network regarding the allocated rate as represented by line 222. The entire source element 200, including the encoder and the interface module, adjusts the rate of information from the interface module into the network thereby controlling the rate to be consistent with the explicit rate permitted by the network.

Figure 7A:
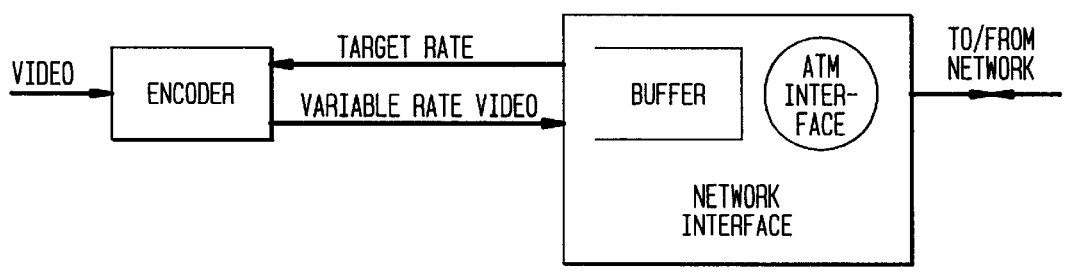
FIGS. 7A and 7B show block diagrams of embodiments of source modules for use with the present invention.
Figure 7B:
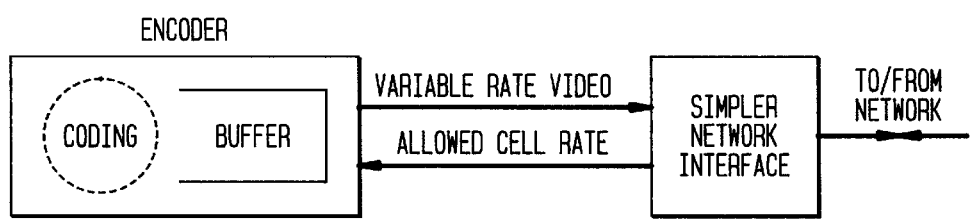

Examples of possible implementations of the source element 200 are shown in greater detail in FIGS. 7A and 7B.

In the first example of FIG. 7A the source element uses an already existing adaptive encoder and couples it to a network interface that may be a combination of hardware and software with a buffer for receiving encoded data from the encoder. In this embodiment the network interface software can: perform the prediction of the desired rate; create the network probe, a resource management cell that, contains the requested or demand rate; receive the allowed rate and adapt the output rate using the buffer that receives the encoded data.

In a second example in FIG. 7B a more standard or generic ATM network (consisting of hardware and software) is used with a more customized encoder that incorporates the prediction capability and which absorbs the buffer for adapting the rate to the allocated rate. In this circumstance the encoder will provide the rate request to the module which, in turn, will insert the request in the appropriate network probe.

The implementations illustrated in FIGS. 7A and 7B are provided only as examples and are not intended to be exhaustive descriptions of how the functionality of source element 200 could be apportioned between an encoder and an ATM interface. The network interface module (software and hardware) can provide feedback to the encoder as shown in FIG. 2 for adjusting the encoding rate. In addition, the network interface may contain its own buffer and in part rely upon that buffer for purposes of controlling the overall bit rate from the video source to the network. In an encoder that is putting out variable bit rate video, the buffer may be outside the encoder or inside it.

The above has been a very broad general description of aspects of the present invention. The following sections provide more descriptions of component portions of the overall system and method including a more detailed description of the available bit rate service, a description of the operation of the feedback control mechanism, a description of the techniques used to predict a source's demand to the network and a description of how the network responds to requests for bandwidth.

The ABR Service

The Available Bit Rate (ABR) service is initially defined in the ATM Forum to support applications that require best-effort service (ATM Forum Traffic Management Specification). These applications desire a low loss rate. There is the possibility that the demands of the sources exceed the resource capacity. Although no assurances are made of maintaining low delay or jitter, a feedback control algorithm attempts to maintain small queues and feasible transmission rates for individual sources, that is, the aggregate transmission rate of all of the currently active sources utilizing a link does not exceed the link capacity. The ABR service also admits to the notion of a minimum bandwidth allocation for a source. Although an admission control mechanism has not been specified one can be defined that is relatively simple and conservative.

In the ABR scheme a source periodically transmits a special resource management (RM) cell to probe the state of the network. More specifically, a source can specify a demand or desired transmit rate (typically in terms of a cell rate) in each transmitted RM cell, in a field identified as the ER (or explicit rate) field. The source also identifies to the network the currently allowed or operating rate (CCR—current cell rate). The switches in the network then compute the rate that they will allocate to each source in accordance with a prescribed bandwidth allocation algorithm. Examples of such algorithms are discussed in more detail in one of the following subsections. Once the network switch computes the allowed rate, with whichever algorithm is selected, then this allowed or allocated rate is overwritten into the ER field of the RM cell if the allowed rate is lower than what was in the received RM cell. That is, if the system will only allow a cell rate less than what was demanded by the source that cell rate will be written into the ER-field replacing the cell rate in the received ER field. As the RM cell progresses from the source to the destination the ER field may be changed one or more times as the various switches through which the information is passed calculate their own allocation of bandwidth based on the traffic from different sources that flow through that switch. Thus, as the RM cell progresses from the source to the destination, the ER-field value reflects the smallest rate allocated by any of the switches in the path for the video. This smallest rate is indicative of the congestion in the path. On reaching its destination, the RM cell is returned to the source. Then, in accordance with the present invention, the transmit rate can be adjusted based on the ER-field value in the returned RM cell. The way in which the encoder adapts to the returned allocated rate is described in further detail in one of the following subsections.

The goal of the explicit rate-based feedback control algorithm is to respond to incipient congestion and to allocate rates to the competing sources in a fair manner, while insuring that the capacity of the network is not exceeded.

Predicting a Demand for the Network

Before describing detailed examples of predictive schemes, a few issues must be appreciated. First, as described with respect to FIGS. 7A and 7B the prediction operation can be done in either the interface module or the encoder or could be otherwise provided for in the source element 200 of FIG. 2. Second, the following detailed descriptions of predictive techniques are merely offered as examples of how the system could predict the demand needs. Such predictions have been used in other contexts. But, the present inventors were the first to appreciate the usefulness of predictions in connection with generating rate requests in the system of the present invention.

In connection with predicting the demand for the network it is important to recognize that there are various classes of video sources. For instance, there are sources with low to moderate activity such as video teleconference sources. In these sources the video image may change infrequently and the amount of change at any one time is likely to be small by comparison to the entirety of the image. Alternatively, there are active sources such as sports telecasts and movies. In these sources, the image changes frequently and the amount of change in an image can be dramatic. In connection with describing a technique for predicting the needs of the source in terms of bandwidth allocation, the inventors have focused on models which characterize the video input in terms of the number of cells per frame of video. Video source models were formulated by examining long traces of recorded traffic giving the number of cells per frame for tens of thousands of frames. The formulated models match the marginal distributions of the data and match the auto-correlation to a certain degree.

Models for Low to Moderate Activity

In traffic for low to moderate activity video, such as video teleconferencing using H.261 or H.261-like coding as described in the CCITT recommendation, models were formulated by examining data recorded during several thirty-minute video teleconferences. The traffic models look similar despite the sequences differing in the details of the coding scheme. The inventors discovered that for the video teleconference models the number of cells per frame can be modeled by a stationary process. The marginal distribution of the number of cells per frame follows a gamma distribution (negative binomial if a discrete distribution is used) and so the number of cells per frame is given by $$X(t) = \frac{\lambda(\lambda t)^{s-1}}{\Gamma(s)} e^{-\lambda t} \quad \text{(Eq. 1)}$$

where $\Gamma(s)$ is the gamma function defined as $$\Gamma(s) = \int_0^\infty t^{s-1} e^{-t} dt \quad \text{(Eq. 2)}$$

The parameters s and $\lambda$ are called the shape and scale parameters respectively and these can be obtained from the mean and variance of the source. Let p be the lag-1 corre-lation. These correlations are typically very high for teleconference sources with p=0.98. This high correlation makes fairly accurate short term forecasting feasible. A very simple forecasting rule is: $X_{n-k} = \lambda = p^k(X_n - \mu)$ where p is the correlation coefficient, and $\mu$, the mean number of cells per frame, is computed on-line. An accurate model is the DAR (1) (Discrete Auto-regressive) model which is a Markov chain determined by three parameters: the mean, variance, and p. The transition matrix is computed as:

$$P = pI + (1-p)Q \quad \text{(Eq. 3)}$$

where p is the auto-correlation coefficient, I is the identity matrix, and each row of Q consists of the negative binomial (or gamma) probabilities $(f_0, \ldots, f_K, F_K)$ where $F_K = \Sigma_{k>K} f_k$ and K is the peak rate. The DAR(1) model matches the auto-correlation of the data over approximately a hundred frame lags. This match is more than sufficient for the inventors' purposes, since the forecasting horizon is a few round-trip times which correspond to only three of four frame lags at most. Knowing the mean, variance and lag-1 correlation of the source, forecasts can be made using the DAR(1) model given only the number of bits in the current frame. The DAR(l) model can be used with any marginal distribution and this was used to model entertainment and MPEG-2 coded video sequences with marginal distributions which are not gamma distributed. (This is described, for example, in "Source Models of Broadcast-Video Traffic", Heyman et al., IEEE/ACM Transactions on Networking, Vol. 4, No. 3, pp. 301–317 June 1996). For teleconference sequences, since the marginal distributions are gamma distributed this generality is not necessary. Moreover, the DAR(l) model has "flat spots" which make its sample paths "look" different from those of the data when comparisons are made for a single source (for multiplexed data sources they are indistinguishable). Though these flat spots may not affect our results, for the teleconferences the inventors used a statistical model more specialized for modeling accurately the short-term fluctuations of single teleconference sources.

A model, called Gamma-Beta Autoregressive or GBAR (1) model, has been proposed. Like the DAR(1) model, the GBAR(1) model is also a three parameter model requiring only knowledge of the mean, variance and 1-lag correlation of the source. It relies on the observation that video teleconferences have gamma marginal distributions and exponentially decaying auto-correlations up to lags of about 100 frames. The main features of the model are summarized below since they are used in the forecasting model.

Let Ga(s, $\lambda$) denote a gamma distributed random variable with shape parameter s and scale parameter $\lambda$. Let Be(t, r) denote a beta distributed random variable. The density function of the beta distribution is given by $$f\beta(x) = \frac{\Gamma(t+r)}{\Gamma(t+1)\Gamma(r+1)} x^{t-1}(1-x)^{r-1}, t, r > -1 \quad \text{(Eq. 4)}$$

The GBAR(1) model uses the following facts: (1) The sum of independent Ga(s, $\lambda$) and Ga(q, $\lambda$) random variables is a Ga(s+q, $\lambda$) random variable, (2) The product of independent Be(t, s-t) and Ga(s, $\lambda$) random variables is a Ga(t, $\lambda$) random variable. The forecasting rule for the GBAR(l) model is given by:

$$X_n = A_n X_{n-1} + B_n \quad \text{(Eq. 5)}$$

Since for video teleconferences it is desirable to have the distribution of $X_n$ (and naturally $X_{n-1}$) to be Ga(s, $\lambda$) (the shape and scale parameters being obtained from the empirical mean and variances as was done for the DAR model), 1 $A_n$ is picked to be a Be(t, s-t) random variable and $B_n$ to be a Ga(s-t, λ) random variable. It may be easily verified from Equations (4) and (5) that when $X_{n-1}$, $A_n$ and $B_n$ are mutually independent, $X_n$ is Ga(s, λ) distributed as desired. Also, the lag-k auto-correlation function is given by $p(k)=(t/s)^k$. Using this t is determined since we know p=p(1), and s (from the mean and variance of the data). the forecasting computation is simple: given $X_{n-1}$ multiply it by $B_n$ a sample from an independent beta distributed random variable and then add $A_n$ drawn from a gamma distribution. Both distributions have parameters which need to be computed only once from the mean, variance and 1-lag correlation of the teleconference sequence of interest.

For four video teleconferences, the GBAR(1) process was used for short-term prediction of the number of cells per frame given the number of cells per frame for the current frame. The mean, variance and 1-lag correlation needed for the predictions is given for each of the sequences in Table 1 below.

TABLE 1

| Sequence | Bytes/Cell | Mean cells/frame | Variance | Lag-1 Correlation |
|---|---|---|---|---|
| A | 14 | 1506 | 262861.29 | .981 |
| B | 48 | 104 | 882.09 | .984 |
| C | 64 | 130 | 5535.36 | .985 |
| D | 64 | 170 | 11577.76 | .970 |

The Active Source Model

Figure 6A:
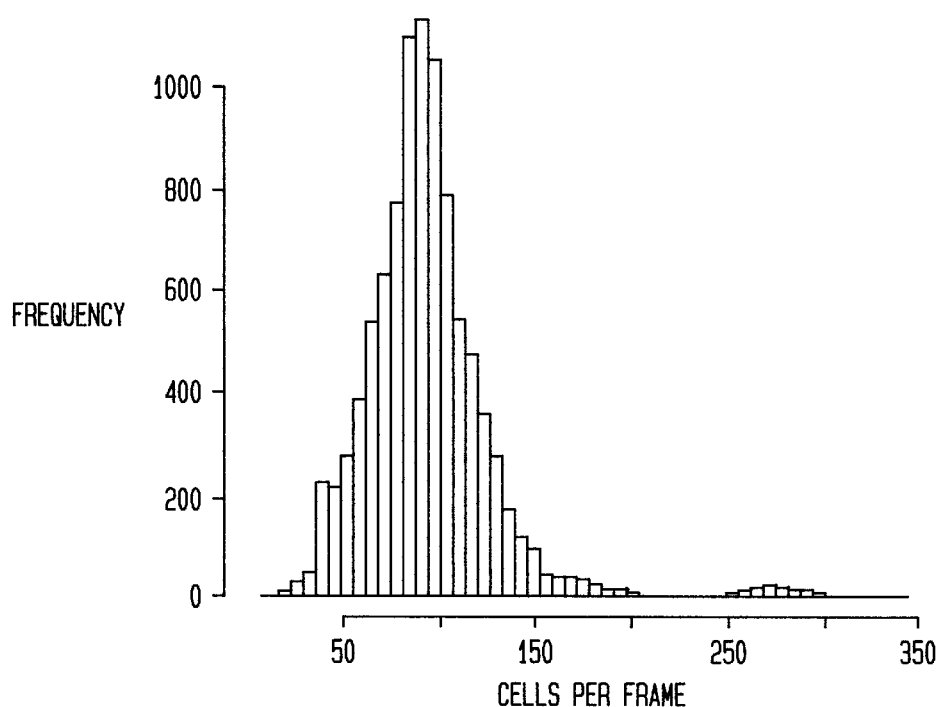
FIGS. 6A and 6B show graphical representations helpful for understanding the prediction of demand rates in accordance with the present invention.
Figure 6B:
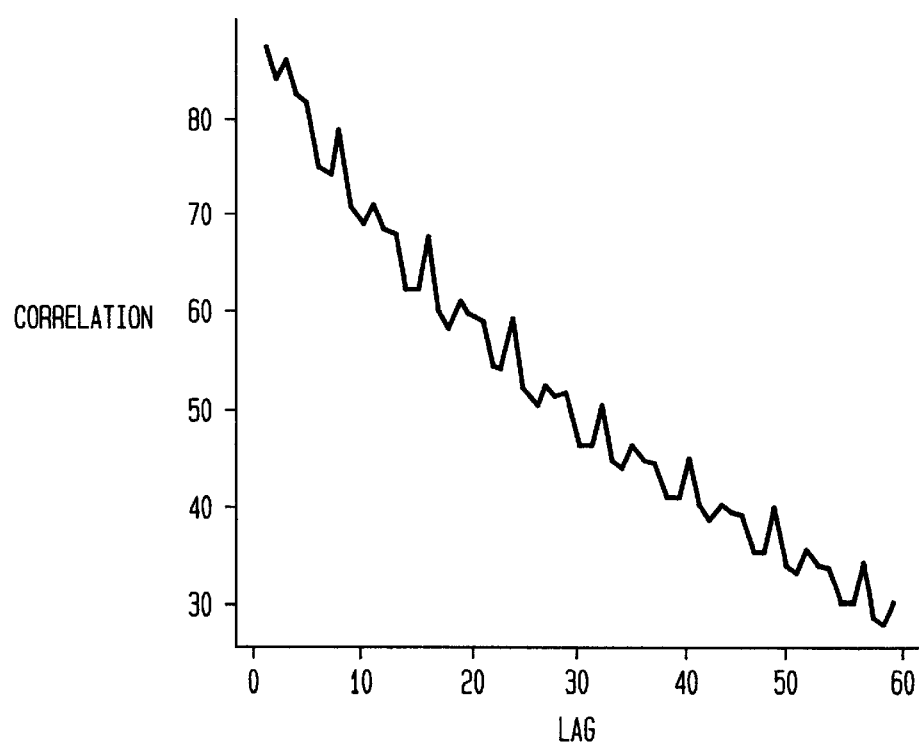

Active sources such as those involved in providing video entertainment such as sports telecasts and movies are generally referred to as MPEG encoded, the basics of which are described in "MPEG Coding for Variable Bit Rate Video Transmission" by Pancha et al., IEEE Communications Magazine, pages 54 to 66, May 1994. A few important aspects of this coding are of interest to understand the source model. There are three picture (frame) types called I, B, P frames, which appear repetitively in the following fifteen frame pattern: I B B T B B T B B T B B T B B. This is called a group of pictures (GOP). The GOP length can vary and the length of fifteen used here is not universal. The P frames are predicted using previous I and P anchor frames. The B frames are predicted in both backward and forward directions by using I or P frames. The I frames are coded in the intraframe mode, so they have less compression than the B and P frames. A histogram and auto-correlation of the B frames of the data is shown in FIGS. 6A and 6B. B frames are shown because they are the most frequently occurring frames in the studied sequence. The other frames have similar characteristics, in particular the high correlations. This is described in a paper entitled "Statistical analysis of MPEG 2-coated video traffic" by Heyman et al., Proceedings of Symposium on Multimedia Communications and Video Coding: A Celebration of the Centennial of Marconi's Invention of Radio Transmission, October 1995. The long right tail in the histogram shows that the bit rate is quite bursty. Also from the plot of auto-correlation it is clear that the short-term correlations are very high—a fact to be exploited for forecasting. The forecasting can be done using the source model developed in the Heyman article. The I frames have a log-normal distribution and the auto correlation of I frames decays geometrically and has the form $0.823^k$ where K is the lag. Consequently, in video teleconferences, I frames can be modeled by a Markov chain with a DAR (1) transition matrix similar to that used for a video teleconference. The matrix Q in this case has rows which are discretizations of the log-normal distribution instead of a negative binomial. Excluding some outliers, the B and P frames also have log-normal distributions (the distributions are not identical since their mean and variances are different). The correlation between successive B frames is very high (0.90). The $B_1$ frames can be modeled by a DAR (1) process with P=0.8 and log-normal marginals succeeding B and P frames are correlated (0.77). These correlated random pairs can be generated using TES which is described in an article "TES: A Class of Methods for Generating Auto Correlated Uniform Variates" by Melemed, Orsa Journal on Computing, 3, pages 317 to 326, 1991.

Having considered the active and inactive sources and their characteristics, it is possible to thus model and predict what the cell rate needs will be for an encoder based on the types of video to be transmitted.

Other Prediction Considerations

The demand for the video source must be predicted sufficiently ahead of time so that feedback from the network arrives in time for providing the rate information to the video encoder to encode the next frame. That is, it is important that the prediction as to a particular part of the video be done far enough in advance so that the network processes the demand and sends back an allocated rate with the appropriate timing to execute that rate on the video which formed the basis for the prediction for the demand. Furthermore, the rate returned (ER) needs to be adequate to transmit the subsequent video frame(s) (until the next feedback is received) without significant degradation in quality or unacceptable delay.

Figure 4:
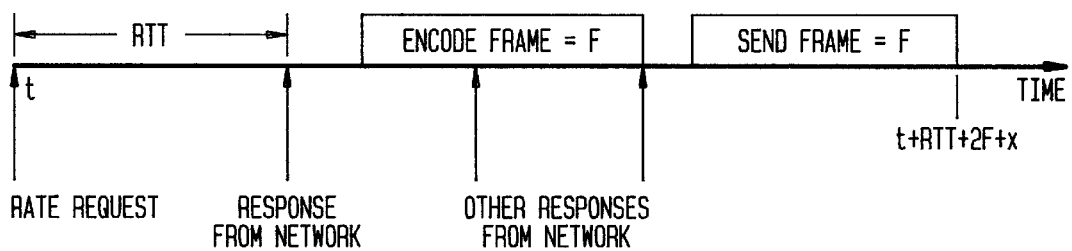
FIG. 4 illustrates a timing diagram for understanding the operation of an embodiment of the present invention.

If one were to take a look at a time line for operation as illustrated in FIG. 4, one would see that a rate request would be made at time t based on the prediction of the frame's requirement at time t+T. T must take into account a number of factors such as the round trip delay of the request through the network (RTT), the time for the encoder itself to adapt to a new rate (E), frame time (F) and the time taken to packetize the data and hand it down to the ATM adaptation layer (δ). Thus, T is represented as equal to RTT+e+F+δ. It is presumed that the encoding of the frame also takes a frame time (F). Frame time F is the time it takes to transmit the bits in the frame at the "ideal rate". This is 33 msecs for a 30 frames/second system. All of the bits of a frame should go out before the next frame is generated F-1/(number of frames per second).

There are several issues with just using the straightforward prediction of a single frame size at F+RTT later. Since there may be considerable variation in the frame sizes, the time for looking ahead in the prediction has to be precise. For example, if the response from the network comes too late for the coder it would mean that encoding would be done according to an earlier rate relating to a previous frame. If the response comes too early, the rate may be superseded by a subsequent rate feedback such that coding will be at a rate more suitable for a frame to be transmitted at a later time. Furthermore, the rate received from the network for this frame (in time for it to be encoded at RTT+e) is implicitly assumed to continue to remain available until t+RTT+e+2F+δ when the frame transmission is completed. If the rates received in subsequent RM cells are different and lower, this may lead to the frame being delayed, because of the lower rate. However, this delay may be acceptable if the minimum cell rate (MCR) is large enough.

Knowing the RTT reliably for a connection may also be difficult, as it comprises propagation delays, queuing delays and processing delays at switches (which may be small) and the source and destination end-systems (which may be larger). Therefore, to limit the sensitivity in precisely matching the prediction of a frame rate at the time when feedback is returned, a smoothing technique is chosen. The requirements of several frames from the next frame to the frame that may be sent 1 RTT later (based on an approximate estimate of RTT) are predicted. The average rate for these frames is then calculated. This average rate can then be used as the demand requested of the network. Specifically, it would be appropriate then to predict the requirements of N frames in advance (as a moving window), and compute a demand (placed at time t) based on the average rate for these N frames. In one example, it might be appropriate to select a window as large as five frames.

Having discussed the techniques for predicting a demand including the timing for such a prediction and the smoothing out of the request or demand based on predictions over a window of frames, it is appropriate to consider how the network treats the demand and how the encoder adapts to the response from the network.

Network Response to Demand

Figure 3:
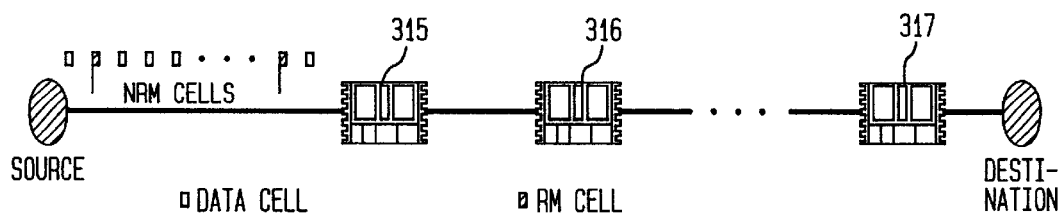
FIG. 3 illustrates a data transfer operation from a source to a destination in the network of FIG. 2.

As described above, each source periodically transmits a special resource management (RM) cell to probe the state of the network. This is illustrated in FIG. 3. Each switch, identified as elements 315, 316, and 317, identifies and conveys its state of congestion as well as additional rate information in its treatment of the RM cell. The source, having predicted a demand as described above, sets a desired transmit rate in each transmitted RM cell. The cell also includes information identifying the actual cell rate. When an RM cell is transmitted, the ER-field is set to Max (Demand, ACR). RM cells are periodically transmitted once every Nrm data cells, for example Nrm may equal 32. Thus, the overhead for carrying the probe cells is bounded while still having the responsive control scheme. Each of the switches then computes the rate that they may allocate to each source. A switch will overwrite an allocated rate in the ER field if the computed rate is lower than what was in the received RM cell. Thus, if switch 311 can only allocate a cell rate that is lower than that requested, then the allocated rate is written over the requested rate (ER field) in the RM cell and included in the message as it travels downstream to switch 312. Switch 312 then operates on this modified RM cell. As the RM cell progresses from the source to destination, the ER field value reflects the smallest rate allocated by any of the switches in the path from the source to the destination. On reaching its destination the RM cell is returned to the source which can then set its transmit rate based on the ER field value as will be described below.

The goal of the explicit rate-based feedback control algorithm is to respond to incipient congestion and to allocate rates to the competing sources in a fair manner, while insuring that the capacity of the network is not exceeded.

There are several switch algorithms proposed for computing the rate to be allocated to a source. Switches compute an allocated rate for each source I based on its requested rate (value in the ER-field) $A_i$ i=1, 2, . . n. Sources are classified as being in a "satisfied" set S or in a "bottle necked" set B. The capacity C of the link is allocated to bottled necked sources as $$A_B = \frac{C - \sum_{i \in S} A_i}{\|B\|} \quad \text{(Eq. 6)}$$

Sources in the satisfied set S are allocated their requested rate $A_i$. To keep the dynamics of the switch policy simple it is possible to implement a straight forward version of a max-min computation broadly described in "Congestion Avoidance in Computer Networks with a Connectionless Network Layer. IV: A Selective Binary Feedback Scheme for General Topologies" by Ramakrishnan et al. DEC-TR-510, Digital Equipment Corporation 1987.

The source maintains a currently allowed rate ACR which is the rate at which queued cells are transmitted out of the source-network interface. Sources maintain a demand (for data sources this may be the outgoing links rate), used for requesting a rate for the network. When an RM cell returns with an allocated rate ER, the source's allowed rate is changed as follows:

if ACR≦ER,
ACR=max (min (ER, demand), MCR)
else ACR=max (min {ACR+(RIF×PCR), ER}, MCR).

A network indication to decrease the rate takes effect immediately. However, when the allocated rate ER returned is higher than the ACR it increases in additive steps of RIF x PCR where RIF is a rate increase factor that is a negotiated parameter and PCR is the peak cell rate for the connection. A large RIF (approximately 1.0) results in converging to a returned ER quickly. The trade off is the potential for some transient overload on the network. To keep the queue build-up small, RIF may be chosen to be small instead (e.g. 1/64). ACR always remains above the minimum cell rate MCR.

In the known max-min fairness algorithm the switch receives the ER fields from the sources for which it is carrying video information and determines as a first matter, based on the gross number of sources an average per source bit rate (or cell rate) available. For instance, if the switch capacity is C and the number of sources is four then the average per source bit rate would be C/4. Then, the explicit rates of the respective sources would be compared to the average bit rate. For any source that already had an explicit bit rate or cell rate lower than the average per source rate those sources would be treated as satisfied sources and would be allocated their full explicit bit rate. Then, the sum of the bit rates allocated to the satisfied sources would be subtracted from the total capacity to determine a remainder capacity. The remainder capacity would then be used to calculate yet another average allocation per source based upon the number of unsatisfied sources remaining. The process described above for comparing requested rates to average allocations would be repeated and the process would continue until only unsatisfied sources remain. At that time the unsatisfied sources would each be allocated some value that would be less than the previously indicated explicit rate. The granted allocation would then be written into the RM cell over the explicit rate (ER) field and sent downstream to the next switch to be used in the calculation at that switch. That second switch would then use that information in the ER field in the same way that the first switch used information in that field.

This is one possible method for calculating an allocation of resources at a switch given the requests from a number of sources and the channel capacity available at the switch. Another technique for calculating allocated rates is described in co-pending application Ser. No. 08/825,995 filed on the same day as this application and entitled A Method for Fair Allocation of Bandwidth the disclosure of which is incorporated by reference herein, now issued as U.S. Pat. No. 5,946,324.

The distributed rate allocation algorithm that seeks to achieve max-min fairness performs this by an iterative process. There is a "global iteration" achieved by RM cells flowing from the source to destination and back, collecting the rate allocation information for the flow. Further, there is a "local iteration" at each switch link to determine the allocation to each of the flows sharing that link.

At the first step of the global iteration, the allocation of all the flows sharing the first-level (tightest) bottleneck is determined. Subsequently, in each of the next steps of the global iteration, the allocation of flows sharing the next-level (next-tightest) bottlenecks is determined, progressing from one bottleneck level to the next, until there is an allocation of the rates to the flows sharing the $K^{th}$-level (loosest) bottleneck in the network. It is known that an upper bound on convergence time of such distributed algorithms determining a max-min fair allocation is K * RTT, where RTT is the maximum round-trip delay for control information to propagate from the source through the network to the destination, and back to the source; and K is the number of different bottleneck rates. (See "Time Scale Analysis and Scalability Issues for Explicit Rate Allocation in ATM Networks," Charny et al., IEEE/ACM Transactions on Networking, Vol. 4, No. 4, August 1996). There may be significant queuing delays for RM cells, as well as propagation delays (e.g., in a wide-area network), which contribute to RTT. As a result of a richly connected network, each link having diverse numbers of flows sharing them or with sources having different demands, the number of distinct rates, K may be large as well. Thus, the time to converge to a final rate allocation for all the flows, once the demands have stabilized, may be larger than a frame time. The source rate adaptation policy needs to be cognizant of this, as we discuss below.

Having described the allocation of rates in accordance with the rates demanded, it is now appropriate to consider how the encoder adapts to the allocated rates.

Adapting the Source Rate to Feedback

After the Demand for a rate is made to the network based on the prediction, the source now has to adapt it's encoding rate to the permitted or allocated rate. There are several increasingly sophisticated options available here for adapting the encoder's quantization level to the allowed transmission rate ACR at the ATM layer.

1. Directly use the instantaneous ACR as the coder's rate to encode the next frame.

2. Use information on the occupancy of the source buffer, between the coder and the ATM layer, to modify the encoding rate.

3. Use a combination of the source buffer and the recent history of ACR returned to adapt the coder's rate.

Using the first option would imply directly using the feedback information from the network to adjust the coding rate for the next frame. There is an immediate connection between the feedback from the network to the coder. This works well if the estimate of the feedback delay is perfect and also if the network returns an ER value that is very close to the Demanded rate. Neither of these are likely. The source should adapt its rate to changing conditions in the network. Moreover, it is difficult to estimate the feedback delay. Another important problem is that during the transient convergence period when the network is attempting to converge to the final weighted max-min rate, ER and hence ACR for the source is continually changing. Using a RIF value that limits the step-size with which the source may build up its ACR towards the returned ER also makes this matching quite difficult. It is also believed that the potentially rapid fluctuations of the coding rate adversely impacts the quality of the video.

The second option takes advantage of local source buffer shown in FIGS. 7A and 7B as being part of either the encoder or the ATM Network interface, between the encoder and the ATM layer to "integrate" the effects of both the differences between the coder's desired rate and the feedback rate. The buffer also smooths out some of the errors in the estimation of the feedback delay. The buffer isolates the network's rate feedback from the encoder to a certain extent. So, the encoder's rate is based on the local buffer occupancy $B_{OCC}$, whose level should be maintained between a low threshold $Q_{low}$ and a high threshold $Q_{high}$. A rate reduction is provided, below the nominal rate the coder needs for the best quality ($R_T$), that is a linear function of the buffer occupancy in the range ($Q_{low}$, $Q_{high}$) The average encoder rate, $\lambda_{avg}$ is determined from the following:

$$\lambda_{avg} = R_T * \frac{B_{occ} - Q_{low}}{(Q_{high} - Q_{low})} \quad \text{(Eq. 7)}$$

While in principle, this does serve the function of smoothing the encoding rate allowed, it completely isolates the encoder from any drastic deviation of the network's feedback. As a result, large differences between $\lambda_{avg}$ and ER may lead to unacceptable queue build-up locally at the source, resulting in either exceeding our delay targets or loss locally from the source buffer.

The encoder's adaptation is enhanced to also account for the currently allowed source transmission rate, ACR, in the third approach. The deviations in the ACR help modify the encoder rate, while ensuring it is over a long enough time scale that the encoder's rate does not track the transients in convergence of rate allocation mechanism, for example.

Knowing the requirements of the frame to be transmitted t+RTT+e+F+δ in the future, the source encoding rate (the quantization level), is computed as a function of both the average ACR and the predicted source buffer occupancy above a specified buffer set-point. The encoder's target rate is:

$$\lambda_{avg} = ACR_{avg} - \left\| \alpha * \frac{(B_{T-F} - SETPOINT)}{timehorizon} \right\| \quad \text{(Eq. 8)}$$

Here, $R_T$ is the required "nominal" (at the best quality) rate for a frame whose transmission time starts at time T, and $B_{T-F}$ is the predicted buffer size at the time the encoder is given the rate to code the frame, and SETPOINT is the desired buffer setpoint at the local source buffer, α is a small gain factor. The time__horizon is the interval over which the attempt is made to bring the predicted buffer $B_{T-F}$ down to the level of the SETPOINT. The time horizon is typically of the order of a few frame times (chosen to be 5), so that the delay for a frame is not adversely affected. The constraint for choosing the buffer SETPOINT is that the contribution to the delay by the source buffer is not excessive. Similarly, $ACR_{AVG}$ is also computed over an interval of a few times (=5 frame times).

It is anticipated that using an estimate based on the source buffer occupancy reduces the dependency on a prediction of the rate required at a precise time in the future. The source buffer makes it possible to smooth the differences between the rate requested and the rate received from the network.

A minimum rate being allocated to the video connection (negotiated through admission control at call set up) is also important. The minimum rate may be based on knowledge of the video source's characteristics, that may be available a priori based on the type of video (e.g., teleconferencing, entertainment video), and the minimum acceptable quality for the user.

Furthermore, it is anticipated that the system should be able to re-adjust the Minimum Cell Rate (MCR) when that rate was incorrectly estimated at the beginning of the connection. One indication that MCR was set too low would be that the quality of the video has suffered when the source has been persistently allocated a rate corresponding to the MCR. Thus, the system would be enhanced if MCR was negotiated in response to selected trigger events, such as:

a) if there is a loss of frames that degrades quality;
b) if a difference between a "desired" high quality, high quantization factor video's rate and the network's allocated rate is large, and if it is frequently like that; and/or
c) if the source buffer often runs at or close to the threshold where there is too much delay in the source buffer that causes delay targets (especially critical for interactive use) to be violated.

Renegotiation of MCR triggers a fresh admission control decision and seeks to ensure a higher MCR. The likelihood is that as other connections are turned off the effect of the renegotiated MCR will be that the resource will not admit other new sources. Thus, MCR can play an important role in establishing baseline quality and in establishing a cut-off point for admitting new sources to share a resource.

One of the issues that arises with using the source adaptation policies described is that the encoder's rate may be altered frequently, thus resulting in impairment of the user perceived quality of the resulting video. Another is that the amount of time taken by the allocation mechanism to converge to the assigned fair rate may be significant. As was observed earlier, it has been shown that it takes a period of RTT per distinct rate in the eventual rate vector for all of the source rates to converge on their final rates. In fact, this is with the source rates immediately tracking the ER value in the returned RM cell because RIF was set to 1. When the rate increase factor, RIF, is smaller than 1, the convergence time is increased further due to the time it takes for the source rate to build up to its final value.

For both of these reasons, it is desirable to use a longer averaging interval as well as reduce the frequency with which the source demand and the encoder's rate are modified. It may be desirable to impose a "damping function" on the frequency of modification of these two values. These of course, depend on how much source delay can be tolerated. A constraint to be used as a rule of thumb is that the end-end delay should not be greater than about 200 to 300 milliseconds per frame.

The choice of the size of the moving window N for averaging the demand also depends on the coding scheme used (e.g., H.261 for video teleconferencing; MPEG for entertainment video). Using an averaging interval that is larger than a frame time is desirable. For example, using an average over several frames, such as a GOP for MPEG may be appropriate.

A final note on implementation is that it has been assumed for the above examples that the network uses a separate queue for the admission-controlled flows such as these compressed video flows, isolated from data flows that may not be admission controlled. As a result, the service discipline at these queues needs to serve these queues in proportion to the rates allocated to each of these classes, within a reasonable time granularity. Admission control may be quite simple, based on the minimum cell rate, MCR, requested at connection setup time.

CONCLUSION

A particular embodiment for providing predicted demands to a network, calculating allocation rates based on the predicted demands, feeding back the allocation rates and adapting the encoder rates based on the allocated rate has been described above in connection with an ATM network of the ABR variety. The general concepts of the present invention, namely the prediction of an encoding rate, the allocation and feedback, and the adaptation can be performed using different networks. Different structures for providing the adaptation (such as a differently structured network interface module) or different predictive techniques for determining a demand rate could be utilized.

What is claimed is:

1. A method for transporting compressed video from a source to a destination over an Asynchronous Transfer Mode network, the method comprising the steps of:

a. predicting bandwidth needs of the source, said predicting including estimating a needed bandwidth based on a prediction of size of frames over a pre-determined period of time;
   b. requesting, by periodically transmitting a resource management cell to the network, that the network provide bandwidth to the source commensurate with the source's predicted need;
   c. receiving a grant of some bandwidth to the source equal to or less than that requested; and
   d. adapting an output rate of the source referring to the amount of bandwidth granted to the source in step c.

2. The method of claim 1 wherein said step of predicting bandwidth further comprises determining an average bandwidth requirement based on a predetermined number of predictions of the size of frames.

3. The method of claim 1 wherein said step of granting comprises the substeps of:

receiving from each of a plurality of sources a requested rate;
   calculating an allocable rate for each source in dependence upon requested rates received; and
   for those sources for whom the network cannot satisfy the requested rate modifying a message to those sources to include notification of an allocable rate.

4. The method of claim 1 wherein said step of adapting comprises the substeps of:

receiving at a source module a network notification of an allocated bandwidth; and
   said source module adjusting an output of compressed video data in accordance with the received notification.

5. The method of claim 4 wherein said source module includes an encoder, and said step of adjusting includes modifying an encoding rate of said encoder.

6. The method of claim 1 further comprising the step of:

negotiating a minimum bandwidth for the video source at a time of initializing communication from the video source.

7. The method of claim 6 comprising the further step of renegotiating the minimum bandwidth if the difference between a requested bandwidth and the allocated bandwidth satisfies a predetermined criterion.

8. A method for transporting video from a source to a destination over an Asynchronous Transfer Mode (ATM) Network, comprising the steps of:

periodically predicting a bandwidth need of the video source, said predicting including estimating a needed bandwidth based on a prediction of size of frames over a pre-determined period of time;
   transmitting a resource management cell to the ATM Network, said resource management cell including a bandwidth request based on the predicted bandwidth need;

allocating bandwidth to the video source equal to or less than said bandwidth request; and adapting an output rate of the video source in accordance with bandwidth allocated to the source.

9. The method of claim 8 wherein said step of predicting bandwidth further comprises determining an average bandwidth requirement based on a predetermined number of predictions of the size of frames.

10. The method of claim 8 wherein said step of granting comprises the substeps of:

receiving from each of a plurality of sources a requested rate;

calculating an allocable rate for each source in dependence upon requested rates received; and for those sources for whom the network cannot satisfy the requested rate modifying the resource management cell to include notification of an allocable rate.

11. A method for establishing a transport rate for compressed video in an Asynchronous Transfer Mode (ATM) network, comprising the steps of:

periodically predicting a bandwidth need of a video source using predictions of frame sizes over a predetermined period of time;

providing a bandwidth request to the ATM network using a resource management cell, said request based on said predicted bandwidth need; and allocating bandwidth to the video source in accordance with the bandwidth request and congestion conditions in the network.

12. The method of claim 11 wherein said step of predicting bandwidth further comprises determining an average bandwidth requirement based on a predetermined number of predictions of the size of frames.

13. The method of claim 11 wherein said step of granting comprises the substeps of:

receiving from each of a plurality of sources a requested rate;

calculating an allocable rate for each source in dependence upon requested rates received; and for those sources for whom the network cannot satisfy the requested rate modifying a message to those sources to include notification of an allocable rate.

14. A method for transporting compressed video from a source to a destination over a network comprising the steps of:

(a) predicting bandwidth needs of the source, said predicting including estimating a needed bandwidth based on a prediction of size of frames over a pre-determined period of time;

(b) requesting, through a resource management cell, that the network provide bandwidth to the source commensurate with the source's predicted need;

(c) receiving a grant of bandwidth to the source equal to or less than that requested; and (d) adapting an output rate of the source referring to the amount of bandwidth granted to the source in step (c).

15. The method of claim 14, further comprising:

(e) renegotiating with the network, after said adapting step (c), to provide bandwidth to the source.

16. A method for transporting compressed video from a source to a destination over a network that uses available bit rate (ABR) class of service, the method comprising:

(a) predicting bandwidth needs of the source said predicting including estimating a needed bandwidth based on a prediction of size of frames over a predetermined period of time;

(b) requesting, through a resource management cell that the network provide bandwidth to the source commensurate with the source's predicted need;

(c) receiving a grant of bandwidth equal to or less than that requested; and (d) adapting an output rate of the source based on the amount of bandwidth grant received in step (c).

17. The method of claim 16, further comprising:

(e) renegotiating with the network, after said adapting step (d), to provide bandwidth to the source.

18. A method for transporting compressed video from a source to a destination over a network comprising the steps of:

(a) predicting bandwidth needs of the source, said predicting including estimating a needed bandwidth based on a prediction of size of frames over a pre-determined period of time;

(b) requesting that the network provide bandwidth to the source commensurate with the source's predicted need;

(c) receiving a grant of bandwidth to the source equal to or less than that requested;

(d) adapting an output rate of the source referring to the amount of bandwidth granted to the source in step (c); and (e) renegotiating with the network, after said adapting step (d), to provide bandwidth to the source.

* * * * *